(12) United States Patent
Lee

(10) Patent No.: US 10,849,263 B2
(45) Date of Patent: Dec. 1, 2020

(54) AGRICULTURAL WORK VEHICLE AND METHOD FOR CONTROLLING HITCH OF AGRICULTURAL WORK VEHICLE

(71) Applicant: LS MTRON LTD., Anyang-si (KR)

(72) Inventor: Jin Woong Lee, Anyang-si (KR)

(73) Assignee: LS MTRON LTD., Anyang (KR)

( * ) Notice: Subject to any disclaimer, the term of this patent is extended or adjusted under 35 U.S.C. 154(b) by 301 days.

(21) Appl. No.: 16/061,926

(22) PCT Filed: Dec. 14, 2016

(86) PCT No.: PCT/KR2016/014653
§ 371 (c)(1),
(2) Date: Jun. 13, 2018

(87) PCT Pub. No.: WO2017/105080
PCT Pub. Date: Jun. 22, 2017

(65) Prior Publication Data
US 2018/0359903 A1 Dec. 20, 2018

(30) Foreign Application Priority Data

Dec. 17, 2015 (KR) .................. 10-2015-0180723
Dec. 13, 2016 (KR) .................. 10-2016-0169919

(51) Int. Cl.
| | | |
|---|---|---|
| A01B 63/112 | (2006.01) | |
| A01B 63/102 | (2006.01) | |
| A01B 63/32 | (2006.01) | |
| A01B 63/111 | (2006.01) | |
| A01B 59/06 | (2006.01) | |

(52) U.S. Cl.
CPC .......... *A01B 63/112* (2013.01); *A01B 63/102* (2013.01); *A01B 63/111* (2013.01); *A01B 63/32* (2013.01); *A01B 59/066* (2013.01)

(58) Field of Classification Search
CPC ... A01B 63/112; A01B 63/102; A01B 63/111; A01B 63/32; A01B 59/066
(Continued)

(56) References Cited

U.S. PATENT DOCUMENTS

| 5,884,204 A | 3/1999 | Orbach et al. |
|---|---|---|
| 7,142,968 B2 | 11/2006 | Alexander et al. |

(Continued)

FOREIGN PATENT DOCUMENTS

| GB | 896505 | 5/1962 |
|---|---|---|
| JP | 1995289016 | 11/1995 |

(Continued)

OTHER PUBLICATIONS

European Search Report for related European Application No. 16876022.1; action dated Aug. 21, 2019; (7 pages).
(Continued)

*Primary Examiner* — Gertrude Arthur Jeanglaude
(74) *Attorney, Agent, or Firm* — K&L Gates LLP

(57) ABSTRACT

An agricultural work vehicle according to an aspect of the present invention, which can adaptively adjust the velocity profile of the hitch according to the weight of the work machine, is characterized by comprising: a hitch on which an work machine is mounted; a weight calculation unit that calculates the weight of the work machine when the work machine is lifted following a first lift of the hitch; and a hitch controller that firstly lifts the hitch according to a reference velocity profile comprising a constant-velocity section (T) and, when calculation of the weight of the work machine is completed, generates an updated velocity profile comprising acceleration sections (a1, a2), constant-velocity sections (b1, b2), and deceleration sections (c1, c1) according to the weight of the work machine, and secondly lifts the hitch according to the updated velocity profile.

17 Claims, 8 Drawing Sheets

(58) Field of Classification Search
USPC .......................................................... 701/50
See application file for complete search history.

(56) References Cited

U.S. PATENT DOCUMENTS

| | | | |
|---|---|---|---|
| 8,060,283 B2* | 11/2011 | Mott ..................... | A01D 43/07 |
| | | | 701/50 |
| 8,649,940 B2* | 2/2014 | Bonefas ................ | B62D 12/02 |
| | | | 348/143 |
| 2006/0030989 A1 | 2/2006 | Alexander et al. | |
| 2008/0110647 A1 | 5/2008 | Guo et al. | |
| 2009/0093928 A1 | 4/2009 | Getman et al. | |
| 2015/0289436 A1 | 10/2015 | Singh | |

FOREIGN PATENT DOCUMENTS

| | | |
|---|---|---|
| JP | 2005102548 | 4/2005 |
| JP | 20122235701 | 6/2012 |
| KR | 20090114599 A | 11/2009 |
| KR | 1020090114599 A | 11/2009 |
| KR | 1020120085426 A | 8/2012 |
| KR | 1020150081356 | 7/2015 |

OTHER PUBLICATIONS

International Search Report for related International Application No. PCT/KR2016/001465; report dated Mar. 15, 2017; (3 Pages).
Written Opinion for related International Application No. PCT/KR2016/001465; report dated May 23, 2016; (8 pages).

* cited by examiner

AGRICULTURAL WORK VEHICLE AND METHOD FOR CONTROLLING HITCH OF AGRICULTURAL WORK VEHICLE

CROSS-REFERENCE TO RELATED APPLICATIONS

The present application is a National Stage of International Application No. PCT/KR2016/014653, filed Dec. 14, 2016, which claims priority to Korean Application No. 10-2015-0180723, filed Dec. 17, 2015, and Korean Application No. 10-2016-0169919, filed Dec. 13, 2016 the disclosures of which are incorporated herein by reference.

TECHNICAL FIELD

The present invention relates to an agricultural work vehicle, and more particularly, to control of a hitch of an agricultural work vehicle.

BACKGROUND ART

Agricultural work vehicles are used to cultivate crops required for human life using soil. For example, combines, tractors, and the like belong to the agricultural work vehicles. A combine is a vehicle configured to reap and thresh crops such as rice, barley, wheat, beans, and the like. A tractor is a vehicle to which various types of work machines are connected to perform an agricultural work in a travelling state or a stationary state, in which a work machine is connected to a hitch mounted on the tractor and the hitch is raised or lowered using hydraulics, thereby performing an agricultural work.

The agricultural work vehicle according to the related art, such as a tractor, raises or lowers the hitch according to only a reference velocity profile as shown in FIG. 1, without considering the weight of the work machine or the engine rotating speed of the agricultural work vehicle in an operation of ascent or descent of the hitch.

Accordingly, at a time of beginning ascent and descent of the hitch or completing ascent and descent of the hitch, an impact resulting from the weight of the work machine is applied to the agricultural work vehicle, and the impact applied to the agricultural work vehicle varies with the weight of the work machine, thereby causing an operator to have increased fatigue and anxiety and also degrading the durability of the hitch.

DISCLOSURE

Technical Problem

Therefore, the present invention is designed to solve the problems and is directed to providing an agricultural work vehicle capable of adaptively adjusting a velocity profile of a hitch according to a weight of a work machine, and a method of controlling a hitch of the agricultural work vehicle.

The present invention is also directed to providing an agricultural work vehicle capable of calculating the weight of a work machine on the basis of engine power information of the agricultural work vehicle, tractive force information of the agricultural work vehicle, a speed of a hydraulic cylinder for driving a hitch, and an angle between a lift arm of the hitch and a horizontal plane, and a method of controlling a hitch of the agricultural work vehicle.

Technical Solution

One aspect of the present invention provides an agricultural work vehicle including a hitch (210) on which a work machine (480) is mounted; a weight calculation unit (430) configured to calculate a weight of the work machine (480) when the work machine (480) is raised by a first ascent of the hitch(210); and a hitch controller (420) configured to firstly raise the hitch (210) according to a reference velocity profile including a constant-velocity section (T), generate an updated velocity profile including an acceleration section ($a_1$, $a_2$), a constant-velocity section ($b_1$, $b_2$), and a deceleration section ($c_1$, $c_2$) according to the weight of the work machine (480) when the calculation of the weight of the work machine (480) is completed, and secondarily raise the hitch (210) according to the updated velocity profile.

According to an embodiment, the hitch controller may generate the updated velocity profile such that the acceleration section ($a_1$, $a_2$) and the deceleration section ($c_1$, $c_2$) become larger and the constant-velocity section ($b_1$, $b_2$) becomes smaller as the weight of the work machine (480) increases. According to the embodiment, the hitch controller may generate the updated velocity profile such that the sum of areas of the acceleration section ($a_1$, $a_2$), the constant-velocity section ($b_1$, $b_2$), and the deceleration section ($c_1$, $c_2$) on the updated velocity profile is maintained to be equal to an area of the constant-velocity section (T) on the reference velocity profile.

The hitch controller may maintain a velocity of ascent of the hitch (210) at a first velocity ($V_1$) for the constant-velocity section (T) of the reference velocity profile, and generate the updated velocity profile such that the velocity of ascent of the hitch (210) is increased to a second velocity ($V_2$, $V_2'$) greater than the first velocity ($V_1$) for the acceleration section ($a_1$, $a_2$) of the updated velocity profile, the velocity of ascent of the hitch (210) is maintained at the second velocity ($V_2$, $V_2'$) for the constant-velocity section ($b_1$, $b_2$) of the updated velocity profile, and the velocity of ascent of the hitch (210) is decreased from the second velocity ($V_2$, $V_2'$) to zero for the deceleration section ($c_1$, $c_2$) of the updated velocity profile, wherein a value of the second velocity ($V_2$, $V_2'$) increases as the weight of the work machine (480) increases.

The weight calculation unit may calculate the weight of the work machine (480) using engine power information of the agricultural work vehicle, tractive force information of the agricultural work vehicle, and an angle between a lift arm (216) of the hitch (210) and a horizontal plane, wherein the engine power information includes a torque of an engine and a rotating speed (revolution per minute (RPM)) of the engine.

The agricultural work vehicle may further include: an engine controller (410) configured to control an engine of the agricultural work vehicle and provide the weight calculation unit (430) with engine power information; a tractive force sensing sensor (460) configured to measure a tractive force of the agricultural work vehicle and provide the weight calculation unit (430) with information about the tractive force; and an angle sensing sensor (440) configured to measure an angle between a lift arm (216) of the hitch (210) and a horizontal plane and provide the weight calculation unit (430) with the angle.

Another aspect of the present invention provides a method of controlling a hitch of an agricultural work vehicle including: upon receiving a command for ascent of a work machine (480) mounted on a hitch (210), firstly raising the hitch (210) according to a reference velocity profile including a constant-velocity section (T); calculating a weight of the work machine (480); generating an updated velocity profile including an acceleration section ($a_1$, $a_2$), a constant-velocity section ($b_1$, $b_2$), and a deceleration section ($c_1$, $c_2$) according to the weight of the work machine (480); and secondarily raising the hitch (210) according to the updated velocity profile.

The weight of the work machine may be calculated using engine power information of the agricultural work vehicle, tractive force information of the agricultural work vehicle, and an angle between a lift arm (216) of the hitch (210) and a horizontal plane.

Still another aspect of the present invention provides a method of controlling a hitch of an agricultural work vehicle including: generating an updated velocity profile including an acceleration section (a1, a2), a constant-velocity section ($b_1$, $b_2$), and a deceleration section ($c_1$, $c_2$); and raising or lowering a work machine (480) by raising or lowering a hitch (210) according to the updated velocity profile, wherein sizes of the acceleration section (a1, a2), the constant-velocity section ($b_1$, $b_2$), and the deceleration section ($c_1$, $c_2$) on the updated velocity profile vary according to a weight of the work machine (480).

The updated velocity profile may be generated such that the acceleration section ($a_1$, $a_2$) and the deceleration section ($c_1$, $c_2$) become larger and the constant-velocity section ($b_1$, $b_2$) becomes smaller as the weight of the work machine (480) increases.

Advantageous Effects

According to the present invention, since a velocity profile of a hitch is adaptively adjusted according to a weight of a work machine, an impact occurring at a time of ascent and descent of the hitch can be reduced, thereby reducing fatigue and anxiety of an operator and improving the durability of the hitch.

In addition, since the weight of the work machine is calculated on the basis of engine power information of an agricultural work vehicle, tractive force information of the agricultural work vehicle, and a rotation angle of a lift arm of the hitch, the accuracy in calculating the weight of the work machine can be improved and the velocity of ascent or descent of the hitch can be adjusted according to an engine rotating speed.

In addition, since an additional component is not required to calculate the weight of the work machine, the construction of the agricultural work vehicle can be prevented from being complicated.

BEST MODE

The terminology used herein should be understood as follows.

The singular forms "a," "an," and "the" also include the plural forms unless the context clearly dictates otherwise, and terms first, second, etc are only used to distinguish one element from another, and the scope of right is not limited by these terms.

Terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or combinations thereof.

As used herein, term "at least one" includes any combination of one or more of the associated listed items. For example, at least one of "a first item," "a second item," and "a third item" may represent not only each of the first item, the second item, and the third item, but also any combination suggested from two or more of the first item, the second item and the third item.

Hereinafter, embodiments of the present invention will be described in detail with reference to the accompanying drawings.

Figure 1:
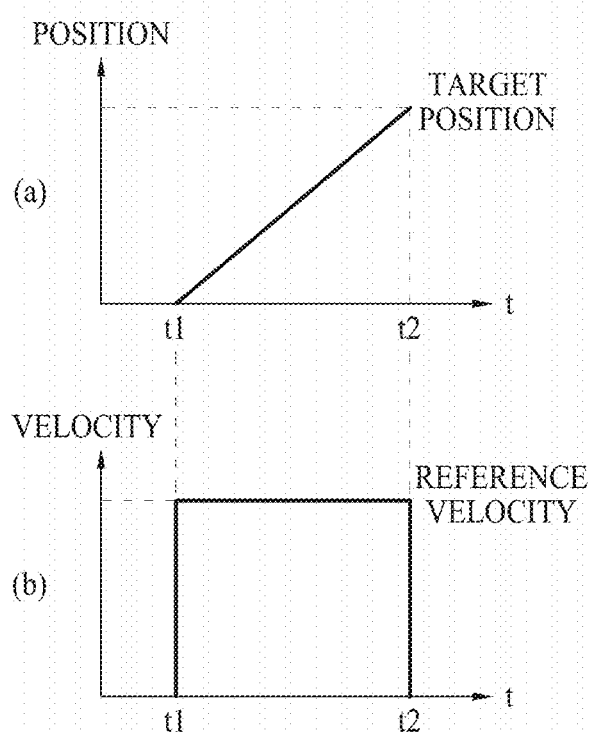
FIG. 1 is a graph showing a reference velocity profile according to a position of a hitch.
Figure 2:
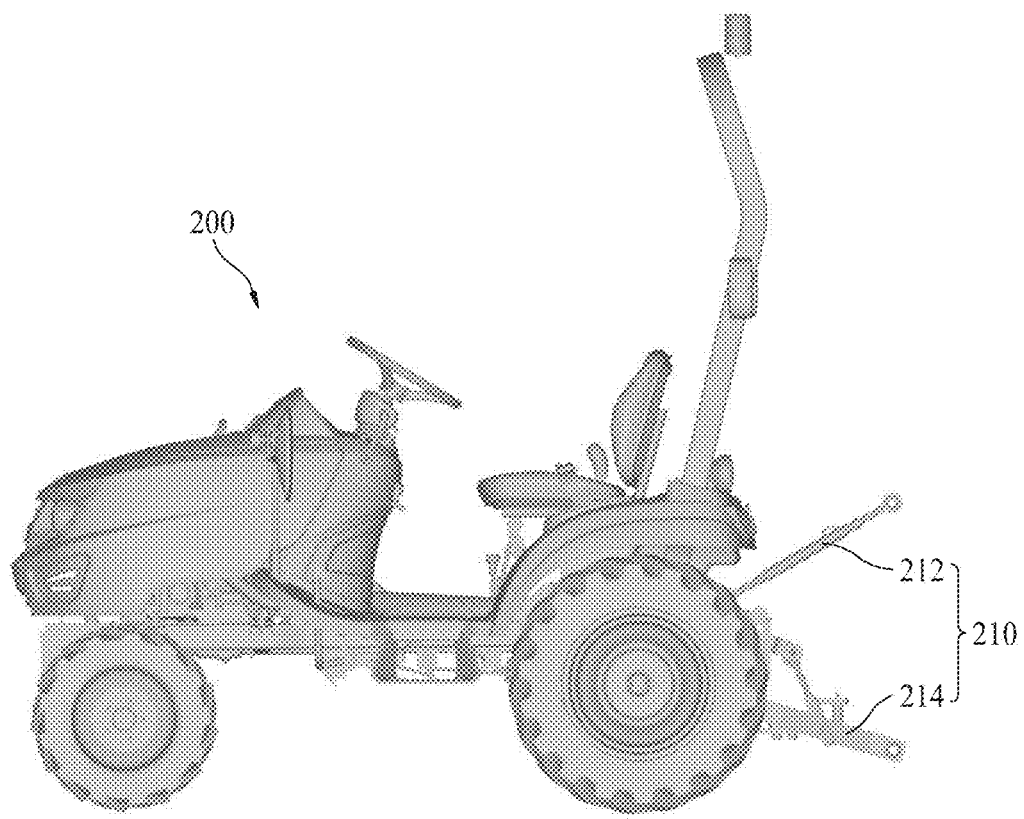
FIG. 2 is a side view illustrating an agricultural work vehicle according to an embodiment of the present invention.

FIG. 2 is a side view illustrating an agricultural work vehicle according to an embodiment of the present invention. As shown in FIG. 2, on an agricultural work vehicle 200 according to the embodiment of the present invention, a hitch 210 for being connected to various types of work machines (not shown) is mounted.

The agricultural work vehicle 200 performs work using various work machines mounted thereon while travelling on an arable land or in a stationary state. According to the embodiment of the present invention, the agricultural work vehicle 200 may be a tractor as shown in FIG. 2. The tractor refers to a vehicle to which various types of work machines (e.g., a rotary, a plow or the like) are connected to perform an agricultural work in a travelling state or a stationary state.

The hitch 210 is mounted on a front part or a rear part of the agricultural work vehicle 200 to connect the work machine to the agricultural work vehicle 200. According to the embodiment, the hitch 210 is raised by a piston movement of a hydraulic cylinder (not shown) when hydraulic oil is supplied into the hydraulic cylinder by a hydraulic pump (not shown) to raise the work machine from the ground. According to the embodiment, the hitch 210 may be a three-point hitch including an upper link 212 and a lower link 214.

Hereinafter, the three-point hitch mounted on the agricultural work vehicle according to the embodiment of the present invention will be described in brief.

Figure 3:
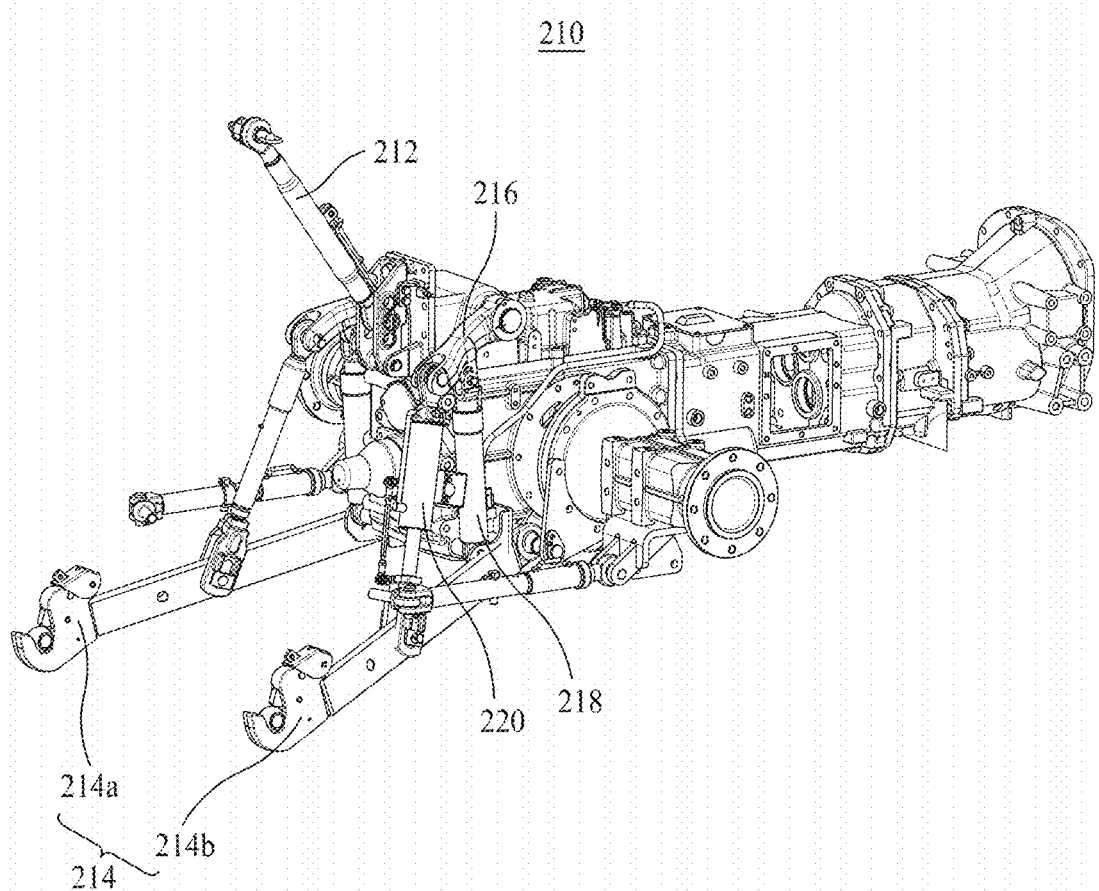
FIG. 3 is a view illustrating a configuration of a hitch shown in FIG. 2.

FIG. 3 is a view showing a configuration of the three-point hitch mounted on the agricultural work vehicle according to the embodiment of the present invention.

Referring to FIG. 3, the three-point hitch 210 includes the upper link 212, the lower link 214, a lift arm 216, and a hydraulic cylinder 218.

The upper link 212 connects an upper portion of the work machine to the agricultural work vehicle 200.

The lower link 214 connects a lower portion of the work machine to the agricultural work vehicle 200. The lower link 214 may include a first lower link 214a and a second lower link 214b.

The lift arm 216 is pivoted by the hydraulic cylinder 218 to have a position thereof changed, and according to the change of position, the upper link 212 and the lower link 214 are raised or lowered.

When hydraulic oil supplied by the hydraulic pump (not shown) is introduced into the hydraulic cylinder 218, the hydraulic cylinder 218 performs a piston movement by an internal hydraulic pressure, thereby allowing the lift arm 216 to pivot.

Although FIG. 2 shows that the agricultural work vehicle 200 is a tractor, the present invention is not limited thereto. The agricultural work vehicle 200 may be provided using any types of vehicles that can mount a link structure for raising or lowering a work machine (e.g., the hitch 210 according to the present invention) on a front part or a rear part thereof.

Hereinafter, the configuration of the agricultural work vehicle according to the present invention will be described with reference to FIG. 4 in more detail.

Figure 4:
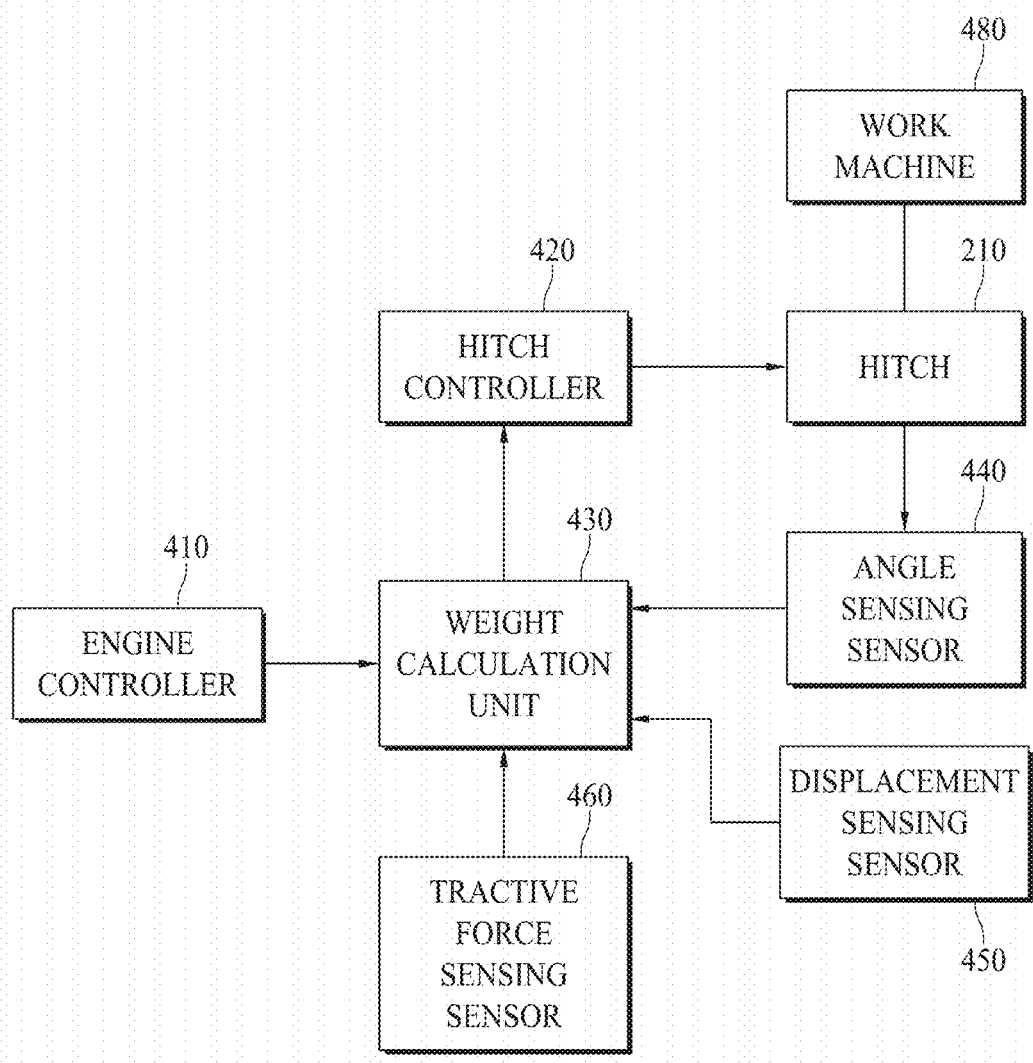
FIG. 4 is a schematic block diagram illustrating a configuration of the agricultural work vehicle according to the embodiment of the present invention.

FIG. 4 is a schematic block diagram illustrating a configuration of the agricultural work vehicle according to the embodiment of the present invention.

As shown in FIG. 4, the agricultural work vehicle 200 according to the embodiment of the present invention includes the hitch 210, an engine controller 410, a hitch controller 420, a weight calculation unit 430, an angle sensing sensor 440, a displacement sensing sensor 450, and a tractive force sensing sensor 460.

As described above, the hitch 210 is configured to connect various types of work machines 480 to the agricultural work vehicle 200, and since the hitch 210 has already been described with reference to FIGS. 2 and 3, a detailed description thereof will be omitted.

The engine controller 410 controls an engine (not shown) for driving the agricultural work vehicle 200 or providing power to the hydraulic cylinder 218 of the hitch 210. In particular, the engine controller 410 according to the present invention provides the weight calculation unit 430 with engine power information such that the weight calculation unit 430 may directly calculate a weight of the work machine 480.

According to the embodiment, the engine power information provided from the engine controller 410 to the weight calculation unit 430 includes a torque of the engine and a rotating speed (revolution per minute (RPM)) of the engine.

The hitch controller 420, upon receiving a request for ascent of the work machine 480, raises the hitch 210 to raise the work machine 480 connected to the hitch 210, and upon receiving a request for descent of the work machine 480, lowers the hitch 210 to lower the work machine 480 connected to the hitch 210.

In particular, the hitch controller 420 according to the present invention allows the velocity of ascent or decent of the hitch 210 to be adaptively adjusted according to the weight of the work machine 480. In this case, the velocity of ascent or decent of the hitch 210 may be adjusted by adjusting the amount of hydraulic oil introduced into the hydraulic cylinder 218.

Figure 5:
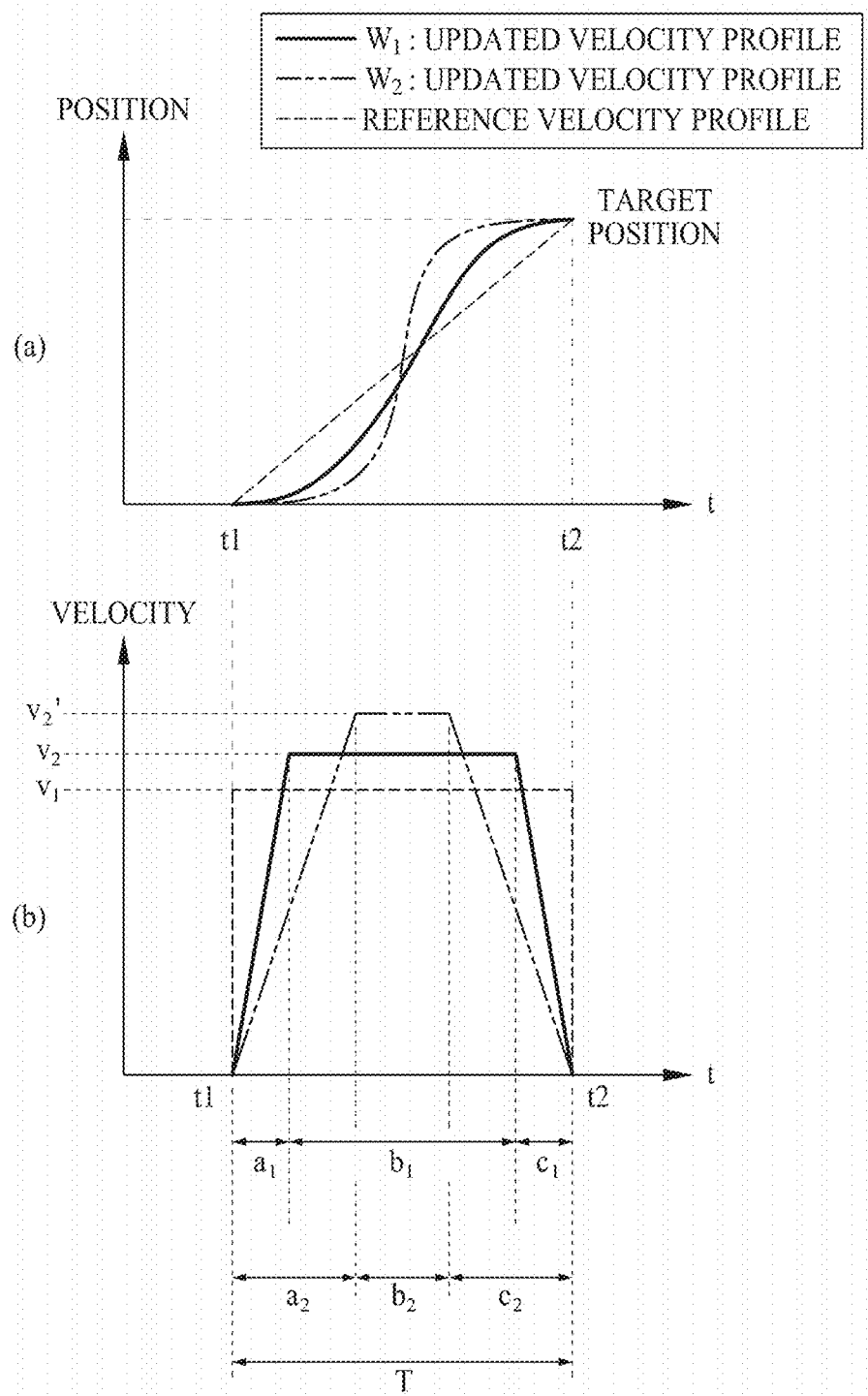
FIG. 5 is a graph showing an updated velocity profile according to the position of the hitch.

In detail, the hitch controller 420 according to the present invention firstly raises the hitch 210 according to a predetermined reference velocity profile. In this case, the reference velocity profile includes a constant-velocity section T as shown in FIG. 5, and thus the hitch controller 420 raises the hitch 210 at a first velocity $V_1$, that is, a reference velocity.

The hitch controller 420, when the calculation of the weight of the work machine 480 is completed by the weight calculation unit 430 with the ascent of the work machine 480 due to the first ascent of the hitch 210, generates an updated velocity profile according to the weight of the work machine 480, and employs the generated updated velocity profile.

According to the embodiment, the hitch controller 420 generates the updated velocity profile including an acceleration section $a_1$ or $a_2$, a constant-velocity section $b_1$ or $b_2$, and a deceleration section $c_1$ or $c_2$ as shown in FIG. 5B. In this case, the hitch controller 420 may vary the sizes of the acceleration section a1 or a2, the constant-velocity section $b_1$ or $b_2$, and the deceleration section c1 or c2 according to the weight of the work machine 480 within a range of the entire section T.

For example, as shown in FIG. 5B, when a weight $W_1$ of a first work machine is less than a weight $W_2$ of a second work machine, the hitch controller 420 may generate the updated velocity profile such that the acceleration section $a_1$ and the deceleration section $c_1$ of the updated velocity profile to raise the first work machine are smaller than the acceleration section $a_2$ and the deceleration section $c_2$ of the updated velocity profile to raise the second work machine, and the constant-velocity section $b_1$ of the updated velocity profile to raise the first work machine is larger than the constant-velocity section $b_2$ of the updated velocity profile to raise the second work machine.

Accordingly, at a time of beginning or ending an ascent of the work machine, the hitch controller 420 may control the hitch 210 to raise the second work machine more slowly than the first work machine, thereby reducing an impact occurring from an ascent of the work machine.

Meanwhile, in the generation of the updated velocity profile, the hitch controller 420 may generate the updated velocity profile such that the sum of areas of the acceleration section $a_1$ or $a_2$, the constant-velocity section $b_1$ or $b_2$, and the deceleration section c1 or c2 on the updated velocity profile in FIG. 5B is provided to be equal to an area of the constant-velocity section T on the reference velocity profile. That is, the hitch controller 420 may generate the updated velocity profile such that the hitch 210 moving according to the updated velocity profile is raised to a target position in the same period of time as that required for the hitch 210 moving according to the reference velocity profile to reach the target position.

According to the embodiment, when the velocity of ascent of the hitch 210 is maintained at a first velocity $V_1$ for the constant-velocity section T of the reference velocity profile, the hitch controller 420 may generate the updated velocity profile such that the velocity of ascent of the hitch 210 is increased to a second velocity $V_2$ or $V_2'$ greater than the first velocity $V_1$ for the acceleration section $a_1$ or $a_2$ of the updated velocity profile, is maintained at the second velocity $V_2$ or $V_2'$ for the constant-velocity section $b_1$ or $b_2$ of the updated velocity profile, and is decreased from the second velocity $V_2$ or $V_2'$ to zero for the deceleration section c1 or c2 of the updated velocity profile.

According to the embodiment, the hitch controller 420 may generate the updated velocity profile such that the value of the second velocity $V_2$ or $V_2'$ increases as the weight of the work machine 480 increases. For example, as shown in FIG. 5, it can be seen that since the weight $W_2$ of the second work machine is greater than the weight $W_1$ of the first work machine, the value of the second velocity $V_2'$ of the updated velocity profile to raise the second work machine is set to be larger than the value of the second velocity $V_2$ of the updated velocity profile to raise the first work machine.

When the generation of the updated velocity profile is completed, the hitch controller 420 secondarily raises the hitch 210 according to the generated updated velocity profile to raise the work machine 480 to the target position.

In addition, the hitch controller 420 may lower the hitch 210 having reached the target position according to the updated velocity profile to lower the work machine 480 to the initial position. In this case, the velocity of the updated velocity profile shown in FIG. 5 represents the velocity of descent of the hitch 210.

As described above, the present invention may reduce an impact occurring at a time of ascent or descent of the hitch 210 by employing the updated velocity profile of the hitch 210 that is generated according to the weight of the work machine 480, thereby reducing fatigue and anxiety of an operator while improving the durability of the hitch 210.

The above description is made on the embodiment in which the hitch controller 420 firstly raises the hitch 210 according to the reference velocity profile, the weight calculation unit 430 calculates the weight of the work machine 480, and the hitch controller 420 generates the updated velocity profile and raises the hitch 210 secondarily and lowers the hitch 210 according to the updated velocity profile. However, the present invention is not limited thereto. The weight of the work machine 480 mounted on the hitch 210 may be previously determined in various methods, for example, an input of an operator, and the hitch controller 420 may generate an updated velocity profile according to the predetermined weight of the work machine 480 and raise or lower the hitch 210 according to the updated velocity profile.

Referring again to FIG. 4, the weight calculation unit 430 calculates the weight of the work machine 480 connected to the hitch 210. In detail, when the work machine 480 is raised by the first ascent of the hitch 210, the weight calculation unit 430 calculates the weight of the work machine 480 on the basis of engine power information and tractive force information generated from the ascent of the work machine 480.

According to the embodiment, the weight calculation unit 430 may calculate the weight of the work machine 480 using engine power information provided from the engine controller 410, an angle between the lift arm 216 of the hitch 210 and a horizontal plane provided from the angle sensing sensor 440, a speed of the hydraulic cylinder 218 for driving the hitch 210 provided from the displacement sensing sensor 450, and tractive force information provided from the tractive force sensing sensor 460.

Hereinafter, a method of calculating the weight of the work machine using the weight calculation unit 430 according to the present invention will be described in detail with reference to FIGS. 3 and 6A to 6C.

Figure 6A:
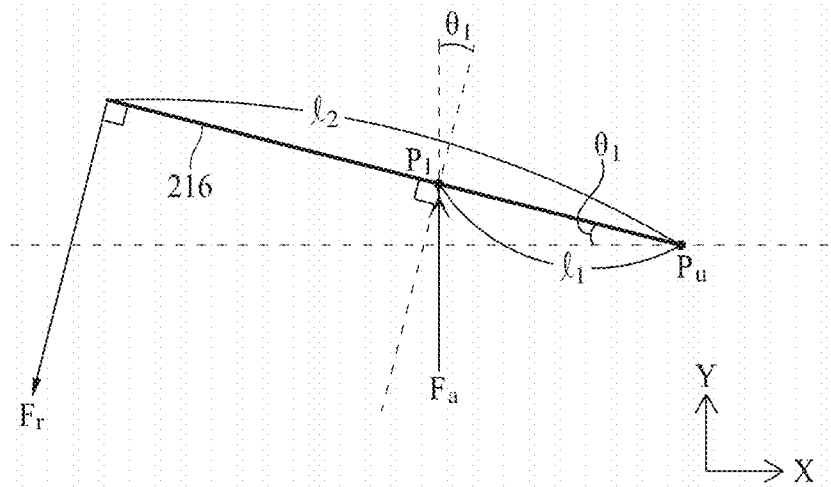
FIG. 6A is a view showing a free body diagram for calculating a force acting on a lift arm of the hitch.
Figure 6B:
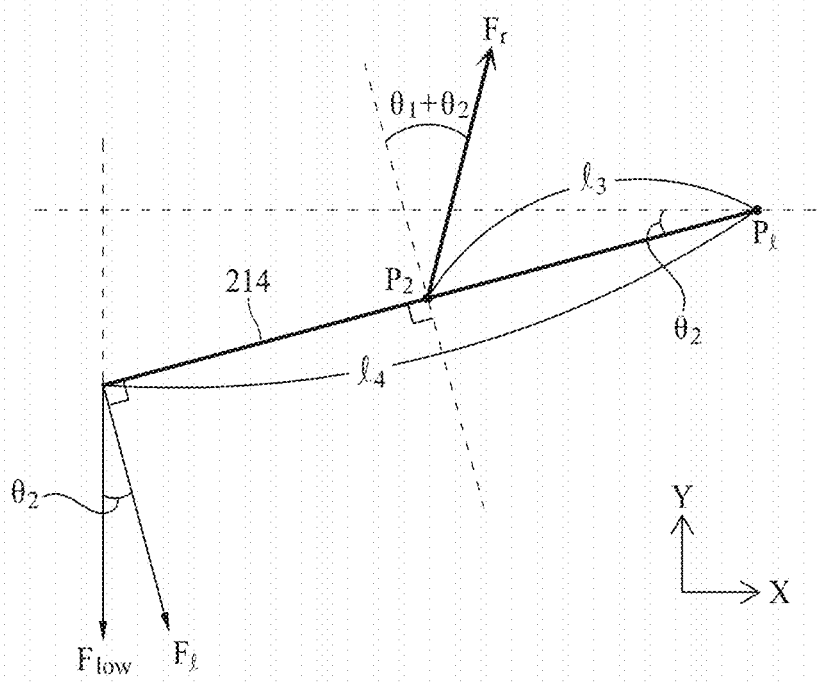
FIG. 6B is a view showing a free body diagram for calculating a force acting on a lower link of the hitch.
Figure 6C:
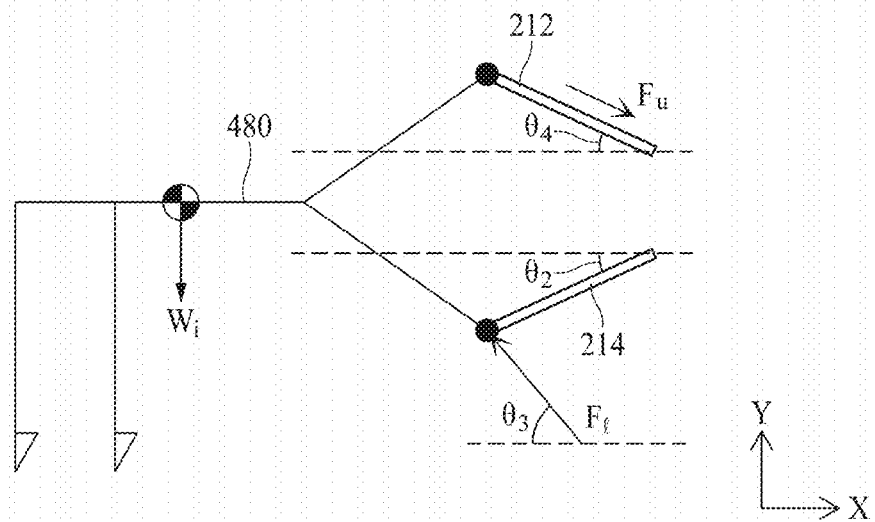
FIG. 6C is a view showing a free body diagram for calculating a weight of a work machine.

FIG. 6A is a view showing a free body diagram for calculating a force acting on the lift arm 216 of the hitch 210, FIG. 6B is a view showing a free body diagram for calculating a force acting on the lower link 214 of the hitch 210, and FIG. 6C is a view showing a free body diagram for calculating the weight of the work machine 480.

First, referring to the free body diagram shown in FIG. 6A, an equation of force equilibrium may be defined as Equation 1, and a force $F_r$ acting on the lift arm 216 may be defined as Equation 2 according to the equation of force equilibrium stated in Equation 1.

$$l_2 F_r = l_1 F_a \cos \theta_1 \qquad \text{[Equation 1]}$$

$$F_r = \frac{l_1}{l_2} F_a \cos \theta_1 \qquad \text{[Equation 2]}$$

In Equations 1 and 2, $F_r$ indicates a force applied from the lift arm 216 to the lower link 214, $l_2$ indicates a length of the lift arm 216, $l_1$ indicates a length from a starting point $P_u$ of the lift arm 216 to a point $P_1$ at which a joint of the hydraulic cylinder 218 is connected to the lift arm 216, $F_a$ indicates an actuating force of the hydraulic cylinder 218, and $\theta_1$ indicates an angle between the lift arm 216 and the horizontal plane. In this case, $\theta_1$ may be calculated by a value measured by the angle sensing sensor 440.

Referring to FIG. 6B, a force $F_{LOW}$ acting on the lower link 214 in a Y-axis direction may be defined as Equation 3 below, and an equilibrium equation of moment acting on the lower link 214 may be defined as Equation 4. According to Equation 4, a force $F_1$ acting on the lower link 214 may be obtained as Equation 5. When Equation 5 is substituted for Equation 3, the force $F_{LOW}$ acting on the lower link 214 in the Y-axis direction is obtained as Equation 6.

$$F_{LOW} = F_1 \cos \theta_2 \qquad \text{[Equation 3]}$$

$$F_1 l_4 = F_r \cos(\theta_1 + \theta_2) l_3 \qquad \text{[Equation 4]}$$

$$F_1 = \frac{l_3}{l_4} F_r \cos(\theta_1 + \theta_2) \qquad \text{[Equation 5]}$$

$$F_{LOW} = \frac{l_3}{l_4} F_r \cos(\theta_1 + \theta_2) \cos \theta_2 \qquad \text{[Equation 6]}$$

In Equations 3 to 6, $F_{LOW}$ indicates a force acting on the lower link 214 in the Y-axis direction, $\theta_2$ indicates an angle between the lower link 214 and the horizontal plane, $l_4$ indicates a length of the lower link 214, and $l_3$ indicates a length from a starting point $P_1$ of the lower link 214 to a joint point $P_2$ of the lower link 214 at which the lift arm 216 is connected to the lower link 214.

Here, when the starting point $P_u$ of the lift arm 216 and the starting point $P_1$ of the lower link 214 are fixed, and the length $l_2$ of the lift arm 216, the length $l_3$ from the starting point $P_1$ of the lower link 214 to the joint point $P_2$ of the lower link 214 at which the lift arm 216 is connected to the lower link 214, and a length of a link 220 between the lift arm 216 and the lower link 214 are determined, the angle $\theta_2$ between the lower link 214 and the horizontal plane may be expressed as the equation of the angle $\theta_1$ between the lift arm 216 and the horizontal plane. That is, $\theta_2$ may be calculated from $\theta_1$.

In addition, according to the free body diagram shown in FIG. 6C, the equation of force equilibrium in the Y-axis direction is expressed as Equation 7, the equation of force equilibrium in an X-axis direction is expressed as Equation 8 below, and thus Equation 9 is derived from Equation 7 and is organized as Equation 11 according to the relationship of trigonometry as shown in FIG. 10.

$$F_U \sin\theta_4 W_1 = F_1 \sin\theta_3 \quad \text{[Equation 7]}$$

$$F_U \cos\theta_4 = F_1 \cos\theta_3 \quad \text{[Equation 8]}$$

$$W_1 = F_1 \sin\theta_3 - F_U \sin\theta_4 \quad \text{[Equation 9]}$$

$$\sin\theta_4 = \cos\theta_4 \tan\theta_4 \quad \text{[Equation 10]}$$

$$W_1 = F_1 \sin\theta_3 - F_U \cos\theta_4 \tan\theta_4 \quad \text{[Equation 11]}$$

In Equations 7 to 11, $F_u$ indicates a force acting on the upper link 212 of the hitch 210, $\theta_4$ indicates an angle between the upper link 212 and the horizontal plane, $W_i$ indicates the weight of the work machine 480, and $\theta_3$ indicates an angle between a force $F_1$ acting on the lower link 214 and the horizontal plane.

When the starting point of the upper link 212 and the starting point $P_1$ of the lower link 214 are fixed, and the distance between a connecting point between the work machine 480 and the upper link 212 and a connecting point between the work machine 480 and the lower link 214 is fixed, and the length $l_2$ of the lift arm 216 and the length $l_4$ of the lower link 214 are determined, the angle $\theta_4$ between the upper link 212 and the horizontal plane may be expressed as the equation of the angle $\theta_2$ between the lower link 214 and the horizontal plane. That is, $\theta_4$ may be calculated from $\theta_2$. In this case, since $\theta_2$ can be calculated from $\theta_1$, $\theta_4$ can be calculated from $\theta_1$.

Referring to FIGS. 6B and 6C, $F_1 \sin\theta_3$ is equal to the force $F_{LOW}$ acting on the lower link 214 in the Y-axis direction, and as stated in Equation 13, $F_U \cos\theta_4$ is equal to a tractive force $F_D$ that is a reaction force acting on the upper link 212 in response to the weight of the work machine, and thus Equation 11 is obtained as Equation 14.

$$F_1 \sin\theta_3 = F_{LOW} \quad \text{[Equation 12]}$$

$$F_U \cos\theta_4 = F_D \quad \text{[Equation 13]}$$

$$W_1 = F_{LOW} - F_D \tan\theta_4 \quad \text{[Equation 14]}$$

When Equations 2 and 6 are substituted for Equation 14, the weight $W_1$ of the work machine 480 is obtained as Equation 15 below.

$$W_i = \frac{l_3}{l_4}\frac{l_1}{l_2} F_a \cos\theta_1 \cos(\theta_1 + \theta_2)\cos\theta_2 - F_D \tan\theta_4 \quad \text{[Equation 15]}$$

Meanwhile, when the agricultural work vehicle 200 is in a stationary state, and engine power $P_e$ of the agricultural work vehicle 200 stated in Equation 16 is completely used as hydraulic power $P_h$ of the hitch 210 stated in Equation 17 below, an actuating force $F_a$ of the hydraulic cylinder 218 is defined as Equation 18 below.

$$P_e = \frac{2\pi T_e N_e}{60000} \quad \text{[Equation 16]}$$

$$P_h = \frac{F_a V_C}{1000\, A} \quad \text{[Equation 17]}$$

$$F_a = \frac{\pi A T_e N_e}{30\, V_C} = \frac{k T_e N_e}{V_C} \quad \text{[Equation 18]}$$

In Equations 16 to 18, $P_e$ indicates engine power of the agricultural work vehicle 200, $T_e$ is a torque of the engine, $N_e$ indicates a rotating speed (RPM) of the engine, $P_h$ indicates hydraulic power of the hitch 210, $V_C$ indicates a speed of the hydraulic cylinder 218, A indicates an area of the hydraulic cylinder 218, and k indicates a proportional constant. In this case, $V_C$ may be calculated through a value measured by the angle sensing sensor 440, or through a value measured by the displacement sensing sensor 450.

Accordingly, when the actuating force $F_a$ of the hydraulic cylinder 218 stated in Equation 18 is substituted for Equation 15, the weight $W_i$ of the work machine 480 is obtained as Equation 19, and the length-related values $l_1$, $l_2$, $l_3$, and $l_4$ of the lift arm 216 and the lower link 214 are converted into constants, so that the weight $W_i$ of the work machine 480 is calculated as Equation 20 below.

$$W_i = \frac{l_3}{l_4}\frac{l_1}{l_2}\frac{kT_e N_e}{V_C}\cos\theta_1 \cos(\theta_1 + \theta_2)\cos\theta_2 - F_D \tan\theta_4 \quad \text{[Equation 19]}$$

$$W_i = c\left(\frac{T_e N_e}{V_C}\right)\cos\theta_1 \cos\theta_2 \cos(\theta_1 + \theta_2) - F_D \tan\theta_4 \quad \text{[Equation 20]}$$

Meanwhile, in Equation 20, the angle $\theta_4$ between the upper link 212 and the horizontal plane and the angle $\theta_2$ between the lower link 214 and the horizontal plane may be calculated from the angle $\theta_1$ between the lift arm 216 and the horizontal plane.

As such, the present invention can calculate the weight of the work machine 480 on the basis of engine power information (e.g., engine torque, engine RPM) of the agricultural work vehicle 200, tractive force information, and the angle between the lift arm 216 and the horizontal plane, thereby improving the calculation accuracy of the weight of the work machine 480, and in addition, an additional component is not required to calculate the weight of the work machine 480, thereby preventing the construction of the agricultural work vehicle 200 from being complicated.

Referring again to FIG. 4, the angle sensing sensor 440 senses a position of the lift arm 216 and provides the weight calculation unit 430 with the sensed value such that the angle between the lift arm 216 of the hitch 210 and the horizontal plane is calculated. The displacement sensing sensor 450 senses displacement of the hydraulic cylinder 218 and provides the weight calculation unit 430 with the sensed value such that the speed of the hydraulic cylinder 218 is calculated. According to the embodiment, the angle sensing sensor 440 provides the weight calculation unit 430 with the sensed position of the lift arm 216, and the displacement sensing sensor 450 provides the weight calculation unit 430 with the sensed displacement of the hydraulic cylinder 218, so that the weight calculation unit 430 calculates the angle between the lift arm 216 and the horizontal plane and the speed of the hydraulic cylinder 218 using the position of the lift arm 216 and the displacement of the hydraulic cylinder 218.

In addition, according to a modified embodiment, the angle sensing sensor 440 may provide the weight calculation unit 430 with the sensed position of the lift arm 216, and the weight calculation unit 430 may calculate the angle between the lift arm 216 and the horizontal plane and the speed of the hydraulic cylinder 218 by only using the position of the lift arm 216. Since the position of the lift arm 216 is determined by the displacement of the hydraulic cylinder 218, the displacement of the hydraulic cylinder 218 may be calculated from the position of the lift arm 216. According to the modified embodiment, the displacement sensing sensor 450 may be omitted.

Figure 7:
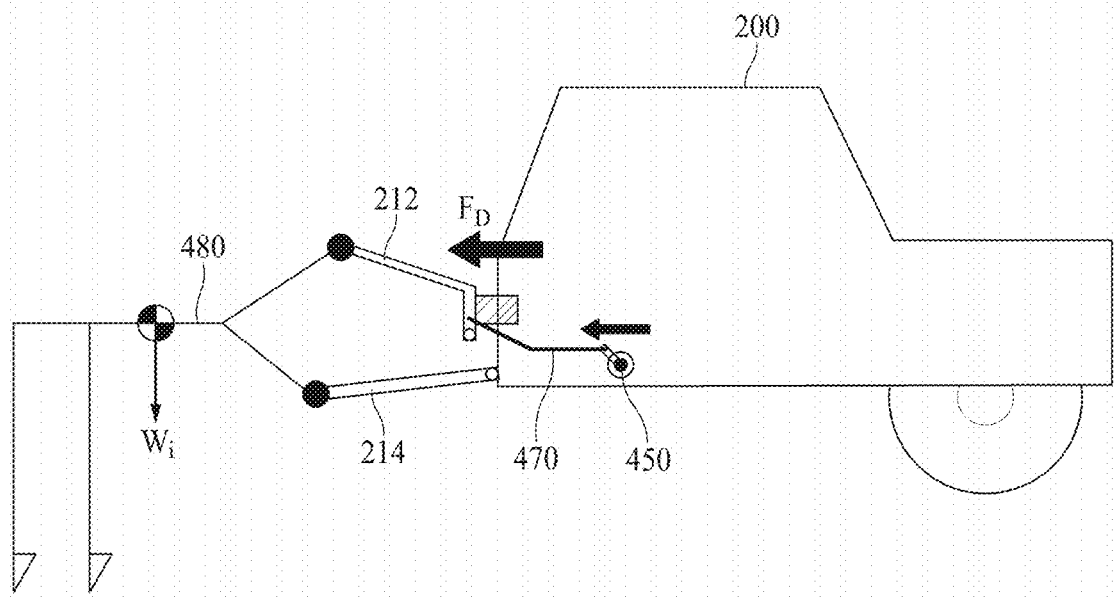
FIG. 7 is a schematic view showing a configuration of a tractive force sensing sensor and a tractive force sensing link that are mounted on the agricultural work vehicle.

The tractive force sensing sensor 460 senses a tractive force of the agricultural work vehicle 200 and provides the weight calculation unit 430 with tractive force information. According to the embodiment, the tractive force sensing sensor 460 is connected to the hitch 210 through a tractive force sensing link 470 as shown in FIG. 7. When the work machine 480 is raised, a force $F_D$ in a direction opposite that of the tractive force acts due to the weight $W_t$ of the work machine 480, and the tractive force sensing sensor 460 senses tractive force information and provides the weight calculation unit 430 with the sensed tractive force information, so that the weight calculation unit 430 calculates a force acting on the upper link 212 on the basis of the tractive force information.

Hereinafter, a method of controlling a hitch of an agricultural work vehicle according to an embodiment of the present invention will be described with reference FIG. 8.

Figure 8:
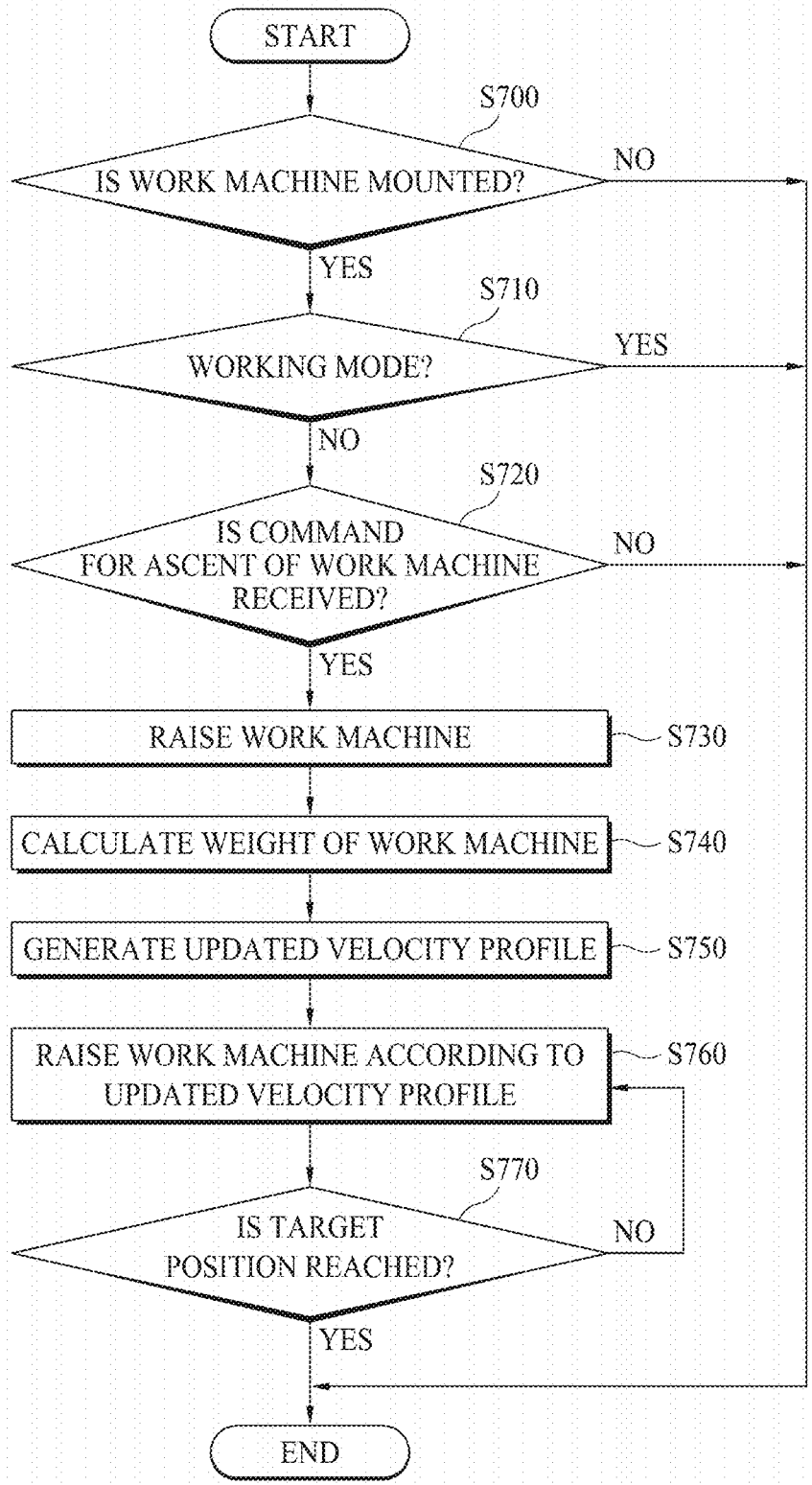
FIG. 8 is a flowchart showing a method of controlling a hitch of an agricultural work vehicle according to an embodiment of the present invention.

FIG. 8 is a flowchart showing a method of controlling a hitch of an agricultural work vehicle according to an embodiment of the present invention.

Referring to FIG. 8, the hitch controller 420 determines whether the work machine 480 is mounted on the hitch 210 (S700).

Upon determination that the work machine 480 is mounted on the hitch 210, the hitch controller 420 determines whether the agricultural work vehicle 200 is in a working mode (S710).

Upon determination that the agricultural work vehicle 200 is not in a working mode, the hitch controller 420 determines whether a command for ascent of the work machine 480 is received (S720), and when the command for ascent of the work machine 480 is received, firstly raises the hitch 210 according to a reference velocity profile including a constant-velocity section to firstly raise the work machine 480 (S730). The reference velocity profile has been illustrated in FIG. 5.

Then, when the work machine 480 is raised, the weight calculation unit 430 calculates the weight of the work machine 480 (S740). According to the embodiment, the weight calculation unit 430 may calculate the weight of the work machine 480 using engine power information of the agricultural work vehicle 200, tractive force information of the agricultural work vehicle 200, and an angle between the lift arm 216 of the hitch 210 and the horizontal plane. In this case, the engine power information includes a torque of an engine and a rotating speed (RPM) of the engine.

In more detail, the weight calculation unit 430 may calculate the weight of the work machine using Equation 20 as described above. Since the process of deriving Equation 20 has already been stated in the description of the configuration of the weight calculation unit 430, a detailed description thereof will be omitted.

When the calculation of the weight of the work machine 480 using the weight calculation unit 430 is completed, the hitch controller 420 generates an updated velocity profile according to the calculated weight of the work machine 480 (S750). The updated velocity profile is illustrated in FIG. 5.

According to the embodiment, in order to raise the hitch 210 to the target position as shown in FIG. 5, the updated velocity profile generated by the hitch controller 420 includes the acceleration section $a_1$ or $a_2$, the constant-velocity section $b_1$ or $b_2$, and the deceleration section c1 or c2, and the sum of areas of the acceleration section $a_1$ or $a_2$, the constant-velocity section $b_1$ or $b_2$, and the deceleration section $c_1$ or $c_2$ on the updated velocity profile is set to be equal to an area of the constant-velocity section T on the reference velocity profile.

According to the embodiment, in this case, the hitch controller 420 may vary the sizes of the acceleration section $a_1$ or $a_2$, the constant-velocity section $b_1$ or $b_2$, and the deceleration section $c_1$ or $c_2$ according to the calculated weight of the work machine 480 within a range of the size of the constant-velocity section T of the reference velocity profile.

For example, as shown in FIG. 5B, when the weight $W_1$ of a first work machine is less than the weight $W_2$ of a second work machine, the hitch controller 420 may generate the updated velocity profile such that the acceleration section $a_1$ and the deceleration section $c_1$ of the updated velocity profile to raise the first work machine are smaller than the acceleration section $a_2$ and the deceleration section $c_2$ of the updated velocity profile to raise the second work machine, and the constant-velocity section $b_1$ of the updated velocity profile to raise the first work machine is larger than the constant-velocity section $b_2$ of the updated velocity profile to raise the second work machine.

Meanwhile, in the generation of the updated velocity profile, the hitch controller 420 may generate the updated velocity profile such that the sum of areas of the acceleration section $a_1$ or $a_2$, the constant-velocity section $b_1$ or $b_2$, and the deceleration section $c_1$ or $c_2$ on the updated velocity profile in FIG. 5B is equal to an area of the constant-velocity section T on the reference velocity profile. That is, the hitch controller 420 generates the updated velocity profile such that the hitch 210 moving according to the updated velocity profile is raised to a target position in the same time period as the time for the hitch 210 moving according to the reference velocity profile to be raised to the target position.

Being able to raise the hitch 210 moving according to the updated velocity profile to a target position in the same time period as the time for the hitch 210 moving according to the reference velocity profile to be raised to the target position represents that an arrival time T (T=t2−t1) from an initial ascending start time t1 of the work machine 480 to a final ascending end time t2 of the work machine 480 is maintained to be always the same even when the velocity of ascent of the work machine 480 or velocity of descent of the work machine 480 varies according to the updated velocity profile, by generating the updated velocity profile such that the sum of areas of the acceleration section $a_1$ or $a_2$, the constant-velocity section $b_1$ or $b_2$, and the deceleration section $c_1$ or $c_2$ on the updated velocity profile in FIG. 5B is equal to an area of the constant-velocity section T on the reference velocity profile.

Accordingly, the arrival time T is maintained to be the same despite adaptively adjusting the velocity profile of the hitch 210 according to the weight of the work machine 480, so that a user may apply the velocity profile of the hitch 210 without having a delay of the driving time of the work machine 480.

In addition, when the velocity of ascent of the hitch 210 is maintained at a first velocity $V_1$ for the constant-velocity section T of the reference velocity profile, the updated velocity profile may be generated such that the velocity of ascent of the hitch 210 is increased to a second velocity $V_2$ or $V_2'$ greater than the first velocity $V_1$ for the acceleration section $a_1$ or $a_2$ of the updated velocity profile, is maintained at the second velocity $V_2$ or $V_2'$ for the constant-velocity section $b_1$ or $b_2$ of the updated velocity profile, and is decreased from the second velocity $V_2$ or $V_2'$ to zero for the deceleration section c1 or c2 of the updated velocity profile.

According to the embodiment, the hitch controller 420 may generate the updated velocity profile such that the value of the second velocity $V_2$ or $V_2'$ increases as the weight of the work machine 480 increases. For example, referring to FIG. 5, it can be seen that since the weight $W_2$ of the second work machine is greater than the weight $W_1$ of the first work machine, a value of the second velocity $V_2'$ of the updated velocity profile to raise the second work machine is set to be larger than a value of the second velocity $V_2$ of the updated velocity profile to raise the first work machine.

Then, the hitch controller 420 secondarily raises the work machine 480 by secondarily raising the hitch 210 according to the updated velocity profile (S760), and determines whether the hitch 210 has reached a target position (S770), and upon determination that the hitch 210 has not reached the target position, repeats operation of S760 until the hitch 210 reaches the target position.

Meanwhile, although not shown in FIG. 8, the hitch controller 420 may lower the hitch 210 having reached the target position to an initial position according to the updated velocity profile such that the work machine 480 is lowered to the initial position.

The above described method of controlling the hitch of the agricultural work vehicle may be implemented in the form of programs executable by various computer devices. The programs for executing the method of controlling the hitch of the agricultural work vehicle may be stored in a recording medium readable by a computer, such as a compact disc read only memory (CD-ROM), a digital versatile disc (DVD), a read-only memory (ROM), a random-access memory (RAM), and a flash memory, or may be stored in a server providing a download function.

It will be apparent to those skilled in the art to which the present invention belongs that the above-described present invention may be embodied in other specific forms without changing the technical spirit or essential features of the present invention.

For example, the above-described embodiments have been described that the hitch controller 420 and the weight calculation unit 430 are separate components, but according to a modified embodiment, the hitch controller 420 and the weight calculation unit 430 may be implemented as a single component.

In addition, the above-described embodiments have been stated that the agricultural work vehicle calculates the weight of the work machine and generates the updated velocity profile according to the calculated weight, but according to a modified embodiment, the agricultural work vehicle may receive the weight of the work machine from the outside, or previously store the weight of the work machine, so that upon receiving a command to move the work machine 480 mounted on the hitch 210, may generate an updated velocity profile including an acceleration section, a constant-velocity section, and a deceleration section such that the sizes of the acceleration section, the constant-velocity section, and the deceleration section of the updated velocity profile are varied according to the weight of the work machine within a predetermined period of time, and may move the hitch 210 according to the updated velocity profile to move the work machine 480.

Therefore, it should be understood by those of skilled in the art that the embodiments disclosed above should be considered in a descriptive sense only and not for purposes of limitation. The scope of the invention is defined not by the detailed description of the invention but by the appended claims, and encompasses all changes and modifications derived from the meanings, scope and equivalents the appended claims in the scope of the present invention.

The invention claimed is:

1. An agricultural work vehicle comprising:
a hitch on which a work machine is mounted;
a weight calculation unit configured to calculate a weight of the work machine when the work machine is raised by a first ascent of the hitch; and
a hitch controller configured to firstly raise the hitch according to a reference velocity profile including a constant-velocity section (T), generate an updated velocity profile including an acceleration section ($a_1$, $a_2$), a constant-velocity section ($b_1$, $b_2$), and a deceleration section ($c_1$, $c_2$) according to the weight of the work machine when the calculation of the weight of the work machine is completed, and secondarily raise the hitch according to the updated velocity profile,
wherein the hitch controller generates the updated velocity profile such that the acceleration section (a1, a2) and the deceleration section (c1, c2) become larger to raise the work machine more slowly at a time of beginning or ending an ascent of the work machine and the constant-velocity section (b1, b2) becomes smaller as the weight of the work machine increases.

2. The agricultural work vehicle of claim 1, wherein the hitch controller generates the updated velocity profile such that the sum of areas of the acceleration section ($a_1$, $a_3$), the constant-velocity section ($b_1$, $b_2$), and the deceleration section ($c_1$, $c_2$) on the updated velocity profile is maintained to be equal to an area of the constant-velocity section (T) on the reference velocity profile.

3. The agricultural work vehicle of claim 1, wherein the hitch controller generates the updated velocity profile such that an arrival time (T=t2−t1) from an initial ascending start time (t1) of the hitch to a final ascending end time (t2) of the hitch on the updated velocity profile is maintained to be equal to an arrival time (T=t2−t1) from an initial ascending start time (t1) of the hitch to a final ascending end time t2 of the hitch on the reference velocity profile regardless of a velocity of ascent of the work machine.

4. The agricultural work vehicle of claim 1, wherein the hitch controller:
maintains a velocity of ascent of the hitch at a first velocity ($V_1$) for the constant-velocity section (T) of the reference velocity profile; and
generates the updated velocity profile such that the velocity of ascent of the hitch is increased to a second velocity ($V_2$, $V_2'$) greater than the first velocity ($V_1$) for the acceleration section ($a_1$, $a_2$) of the updated velocity profile, the velocity of ascent of the hitch is maintained at the second velocity ($V_2$, $V_2'$) for the constant-velocity section ($b_1$, $b_2$) of the updated velocity profile, and the velocity of ascent of the hitch is decreased from the second velocity ($V_2$, $V_2'$) to zero for the deceleration section ($c_1$, $c_2$) of the updated velocity profile,
wherein a value of the second velocity ($V_2$, $V_2'$) increases as the weight of the work machine increases.

5. The agricultural work vehicle of claim 1, wherein the weight calculation unit calculates the weight of the work machine using engine power information of the agricultural work vehicle, tractive force information of the agricultural work vehicle, and an angle between a lift arm of the hitch and a horizontal plane.

6. The agricultural work vehicle of claim 5, wherein the engine power information includes a torque of an engine and a rotating speed (revolution per minute (RPM)) of the engine.

7. The agricultural work vehicle of claim 1, wherein the weight calculation unit calculates the weight of the work machine using Equation:

$$W_i = c\left(\frac{T_e N_e}{V_C}\right)\cos\theta_1\cos\theta_2\cos(\theta_1+\theta_2) - F_D\tan\theta_4,$$

wherein $W_1$ indicates the weight of the work machine, C indicates a proportional constant, $T_e$ indicates a torque of an engine, $N_e$ indicates a rotating speed (revolution per minute (RPM)) of the engine, $V_C$ indicates a speed of a hydraulic cylinder for driving the hitch, $\theta_1$ indicates an angle between a lift arm and a horizontal plane, $\theta_2$ indicates an angle between a lower link constituting the hitch and the horizontal plane, $\theta_4$ indicates an angle between a upper link constituting the hitch and the horizontal plane, and $F_D$ indicates tractive force information.

8. The agricultural work vehicle of claim 1, further comprising:
an engine controller configured to control an engine of the agricultural work vehicle and provide the weight calculation unit with engine power information;
a tractive force sensing sensor configured to measure a tractive force of the agricultural work vehicle and provide the weight calculation unit with tractive force information; and
an angle sensing sensor configured to measure an angle between a lift arm of the hitch and a horizontal plane and provide the weight calculation unit with the angle.

9. A method of controlling a hitch of an agricultural work vehicle, the method comprising:
upon receiving a command for ascent of a work machine mounted on a hitch, firstly raising the hitch according to a reference velocity profile including a constant-velocity section (T);
calculating a weight of the work machine;
generating an updated velocity profile including an acceleration section ($a_1$, $a_2$), a constant-velocity section ($b_1$, $b_2$), and a deceleration section ($c_1$, $c_2$), according to the weight of the work machine; and
secondarily raising the hitch according to the updated velocity profile,
wherein in the generating of the updated velocity profile, the updated velocity profile is generated such that the acceleration section (a1, a2) and the deceleration section (c1, c2) become larger to raise the work machine more slowly at a time of beginning or ending an ascent of the work machine and the constant-velocity section (b1, b2) becomes smaller as the weight of the work machine increases.

10. The method of claim 9, wherein in the generating of the updated velocity profile, the updated velocity profile is generated such that the sum of areas of the acceleration section ($a_1$, $a_2$), the constant-velocity section ($b_1$, $b_2$), and the deceleration section ($c_1$, $c_2$) on the updated velocity profile is maintained to be equal to an area of the constant-velocity section (T) on the reference velocity profile.

11. The method of claim 9, wherein in the generating of the updated velocity profile, the updated velocity profile is generated such that an arrival time (T=t2−t1) from an initial ascending start time (t1) of the hitch to a final ascending end time (t2) of the hitch on the updated velocity profile is maintained to be equal to an arrival time (T=t241) from an initial ascending start time (t1) of the hitch to a final ascending end time (t2) of the hitch on the reference velocity profile regardless of a velocity of ascent of the work machine.

12. The method of claim 9, wherein in the calculating of the weight of the work machine, the weight of the work machine is calculated using engine power information of the agricultural work vehicle, tractive force information of the agricultural work vehicle, and an angle between a lift arm of the hitch and a horizontal plane.

13. The method of claim 12, wherein the engine power information includes a torque of an engine and a rotating speed (revolution per minute (RPM)) of the engine.

14. The method of claim 9, wherein in the calculating of the weight of the work machine, the weight of the work machine is calculated using Equation:

$$W_i = c\left(\frac{T_e N_e}{V_C}\right)\cos\theta_1\cos\theta_2\cos(\theta_1+\theta_2) - F_D\tan\theta_4,$$

wherein Wi indicates the weight of the work machine, C indicates a proportional constant, $T_e$ indicates a torque of an engine, $N_e$ indicates a rotating speed (revolution per minute (RPM)) of the engine, $V_C$ indicates a speed of a hydraulic cylinder for driving the hitch, $\theta_1$ indicates an angle between a lift arm and a horizontal plane, $\theta_2$ indicates an angle between a lower link constituting the hitch and the horizontal plane, $\theta_4$ indicates an angle between a upper link constituting the hitch and the horizontal plane, and $F_D$ indicates tractive force information.

15. A method of controlling a hitch of an agricultural work vehicle, the method comprising:
generating an updated velocity profile including an acceleration section (a1, a2), a constant-velocity section ($b_1$, $b_2$), and a deceleration section ($c_1$, $c_2$); and
raising or lowering a work machine by raising or lowering a hitch according to the updated velocity profile,
wherein sizes of the acceleration section (a1, a2), the constant-velocity section ($b_1$, $b_2$), and the deceleration section ($c_1$, $c_2$) on the updated velocity profile are varied according to a weight of the work machine, and
wherein in the generating of the updated velocity profile, the updated velocity profile is generated such that the acceleration section (a1, a2) and the deceleration section (c1, c2) become larger to raise the work machine more slowly at a time of beginning or ending an ascent of the work machine and the constant-velocity section (b1, b2) becomes smaller as the weight of the work machine increases.

16. The method of claim 15, wherein in the generating of the updated velocity profile, the updated velocity profile is generated such that the sum of areas of the acceleration section (a1, a2), the constant-velocity section ($b_1$, $b_2$), and the deceleration section ($c_1$, $c_2$) is maintained to be constant.

17. The method of claim 15, wherein in the generating of the updated velocity profile, the updated velocity profile is generated such that an arrival time (T=t2−t1) from an initial starting time (t1) of the hitch to a final ending time (t2) of the hitch on the updated velocity profile is maintained to be constant.

* * * * *